(12) United States Patent
Jakoubovitch

(10) Patent No.: US 8,373,970 B2
(45) Date of Patent: Feb. 12, 2013

(54) SIDEWAYS CONDUCTION COOLED HIGH-POWER CAPACITOR

(75) Inventor: Albert Jakoubovitch, Jerusalem (IL)

(73) Assignee: Celem Passive Components Ltd., Jerusalem (IL)

( * ) Notice: Subject to any disclaimer, the term of this patent is extended or adjusted under 35 U.S.C. 154(b) by 0 days.

(21) Appl. No.: 12/919,759

(22) PCT Filed: Mar. 19, 2009

(86) PCT No.: PCT/IL2009/000313
§ 371 (c)(1),
(2), (4) Date: Aug. 26, 2010

(87) PCT Pub. No.: WO2009/116046
PCT Pub. Date: Sep. 24, 2009

(65) Prior Publication Data
US 2011/0002079 A1    Jan. 6, 2011

(30) Foreign Application Priority Data

Mar. 20, 2008    (IL) .......................................... 190329

(51) Int. Cl.
*H01G 9/00*    (2006.01)
(52) U.S. Cl. ........ 361/502; 361/328; 361/504; 361/509; 361/512; 361/503
(58) Field of Classification Search .................. 361/328, 361/502–503, 329–330, 306.2, 504, 509–512; 439/532
See application file for complete search history.

(56) References Cited

U.S. PATENT DOCUMENTS

| 5,953,201 A | 9/1999 | Jakoubovitch |
| 7,002,789 B1 * | 2/2006 | Georgopoulos .............. 361/328 |
| 7,218,489 B2 * | 5/2007 | Wilk et al. ...................... 361/42 |
| 7,704,098 B2 * | 4/2010 | Lambie et al. .......... 439/607.28 |

FOREIGN PATENT DOCUMENTS

| EP | 0033697 A2 | 8/1981 |
| EP | 1508905 A2 | 2/2005 |
| EP | 1696445 A1 | 8/2006 |
| FR | 2360975 | 3/1978 |
| WO | 93/17439 | 9/1993 |

OTHER PUBLICATIONS

PCT International Preliminary Report on Patentability, for parent PCT/IL2009/000313, May 17, 2010.

* cited by examiner

*Primary Examiner* — Nguyen T Ha
(74) *Attorney, Agent, or Firm* — Marsteller & Associates, P.C.

(57) ABSTRACT

A capacitor consisting of two essentially parallel planar L-shaped or C-shaped metal brackets, formed from a thermally and electrically conductive metal and arranged in such a way as to face inwards, between which two or more capacitor elements are connected electrically and thermally, each containing one or more holes for allowing fixing the capacitor to a heat-sink by a mounting bolt. Each of the brackets may have one or more holes drilled in their parallel members.

16 Claims, 5 Drawing Sheets

SIDEWAYS CONDUCTION COOLED HIGH-POWER CAPACITOR

FIELD OF THE INVENTION

The present invention relates to the field of power capacitors. More particularly, the invention relates to a method and apparatus for mounting and cooling power capacitors.

BACKGROUND OF THE INVENTION

Prior to 1978, conduction cooled capacitors, used for example in induction heaters, were connected between two plates on either side of the capacitor. FR2360975 describes a sideways cooled power capacitor that comprises dielectric layers such as silvered mica, disposed between two metal plate electrodes and encased in an insulating material e.g. epoxy resin. Each plate is extended by a flange parallel to the plane of the dielectric layers. The flanges have tabs perpendicular to the plates for mounting onto water-cooled bus bars.

U.S. Pat. No. 5,953,201 discloses sideways conduction-cooled capacitors with one or more bores extending through each of the capacitor electrodes for receiving the capacitor fastening bolts. This design for a sideways cooled capacitor uses solid copper electrodes with contact surfaces replacing the fixing legs used in previous designs. It also makes use of wound polypropylene film capacitor elements and is mounted using two through holes. However, this design has the disadvantage that machining is required for the solid electrodes which also need a large quantity of copper, thus making the manufacturing process expensive.

U.S. Pat. No. 7,002,789 discloses a capacitor assembly mountable on bus bars, has two or more capacitive elements arranged between opposing L-shaped sections of two brackets including "arcuate" sections. The capacitive elements are arranged between a pair of brackets having an "arcuate" bracket section between a pair of L-shaped sections. Each of the capacitive elements has one end contacting capacitor seating surface of one bracket, and the other end contacting with the seating surfaces of the other bracket. However, the complexity of the "arcuate" sections of these brackets increases the cost.

All the methods described above have not yet provided satisfactory solutions to the problem of manufacturing a power capacitor which is compact, lightweight and cost effective while allowing effective cooling.

It is therefore an object of the present invention to provide a method for manufacturing a conduction cooled power capacitor which is compact, lightweight and cost effective while allowing effective cooling.

Other objects and advantages of the invention will become apparent as the description proceeds.

SUMMARY OF THE INVENTION

The present invention is directed to a capacitor consisting of two essentially parallel planar metal brackets (which can be L-shaped or C-shaped) formed from a thermally and electrically conductive material and arranged in such a way as to face inwards. Two or more capacitor elements are connected electrically and thermally between the planar metal brackets. Each metal bracket contains one or more holes for fixing the capacitor to a heat-sink with a mounting bolt. Alternatively, multiple capacitor elements can be arranged between the planar brackets.

The capacitor may further comprise an additional surface extending outwardly from the copper bracket, such that the additional surface is located on the connection leg extended outwards from the capacitor, for increasing the contact area with the heat-sink. The bolt entry point may also be located in the outer part of the additional surface.

The empty space between the brackets may be filled with a resin or another filler material, for increasing mechanical strength and to improve aesthetics.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention discloses a conduction-cooled power capacitor that overcomes the problems of prior art solutions, in order to simplify it and reduce manufacturing costs. The proposed conduction-cooled power capacitor is designed to connect sideways directly to a pair of bus bars that provide both an electrical and thermal connection (bus bars are normally water cooled in induction heating applications), characterized by fixing legs that are turned inwards. Fixing is achieved using mounting bolts that pass through the holes.

Figure 1:
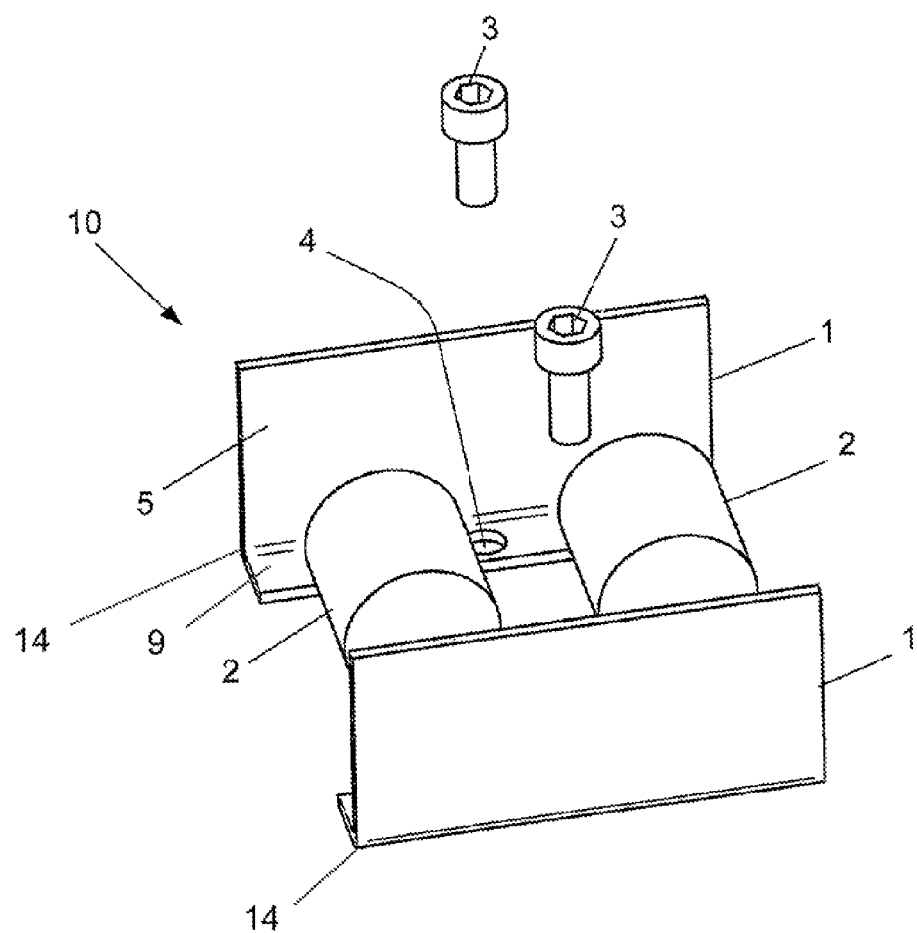
FIG. 1 schematically illustrates the construction of a conduction-cooled power capacitor with L-shaped brackets, according to a preferred embodiment of the invention.

FIG. 1 schematically illustrates the construction of such a conduction-cooled power capacitor, according to a preferred embodiment of the invention. In this example the conduction-cooled power capacitor 10 consists of two L-shaped sheet copper brackets 1, arranged in such a way as to face inwards. Two or more capacitor elements 2 are connected electrically and thermally between the two main surfaces 5. A mounting hole 4 is drilled in the fixing base 9 (serving as a fixing leg) of each electrode to allow connecting the capacitor 10 to a bus bar while maintaining backwards compatibility with the technique used in previous designs, such as those described in U.S. Pat. No. 5,953,201. Main surface 5 is essentially planar and extends by a right angle corner 14 to fixing base 9.

Figure 2:
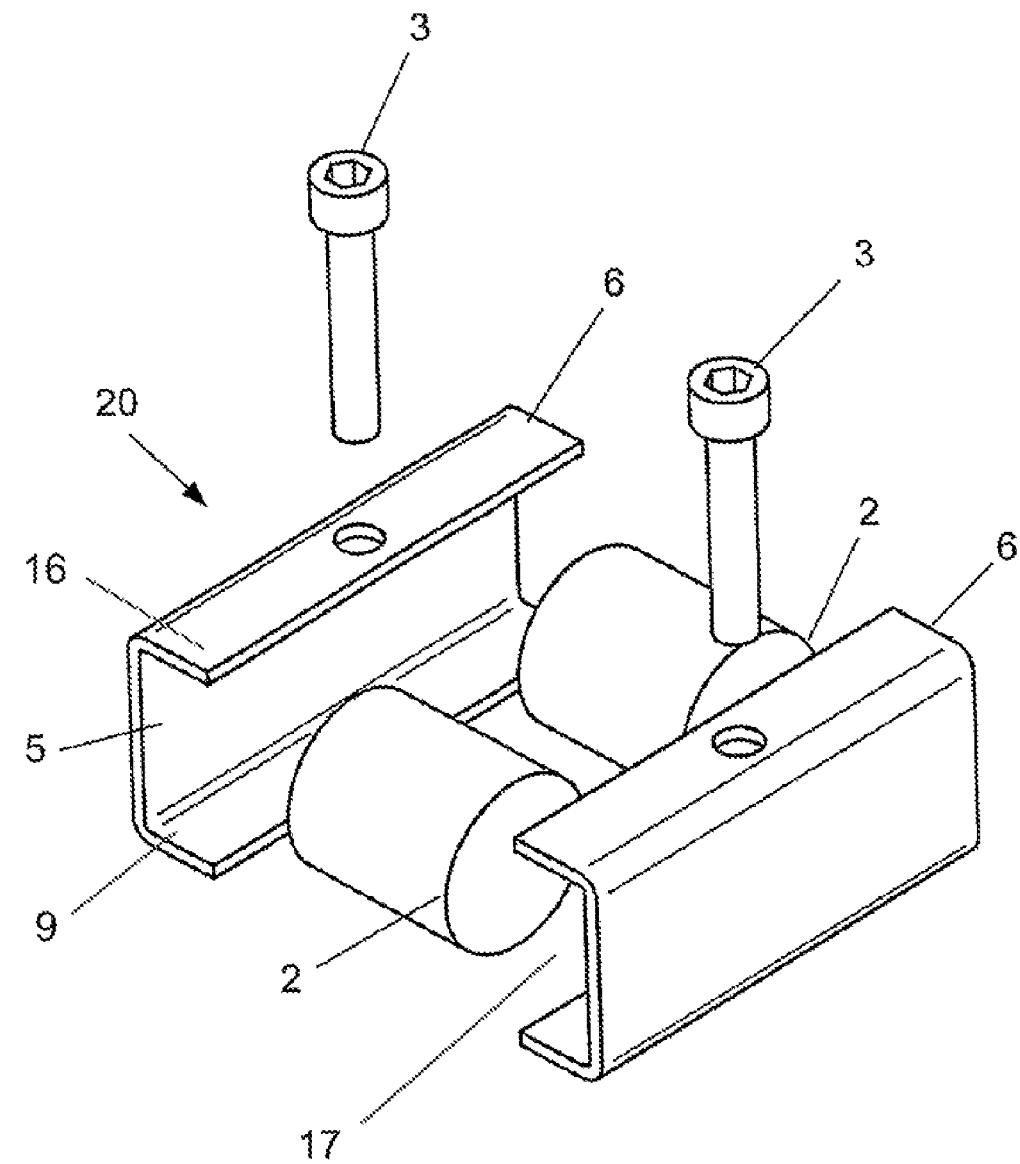
FIG. 2 schematically illustrates the construction of a conduction-cooled power capacitor with C-shaped brackets, according to a preferred embodiment of the invention.

FIG. 2 schematically illustrates the construction of such conduction-cooled power capacitor, according to another preferred embodiment of the invention. In this alternative example, the capacitor 20 includes a C-section 6 that is used in order to allow a pair of holes 4 in parallel members 9 and 16 of each C-section similar to that used in said existing designs with the advantage that access to the fixing head of bolt 3 is improved, comparing to the L-section design, by moving the mounting point outside of the capacitor 20. Capacitor elements 2 are shown to be electrically and thermally connected within the empty space 17 between the two C-sections 6.

Figure 3:
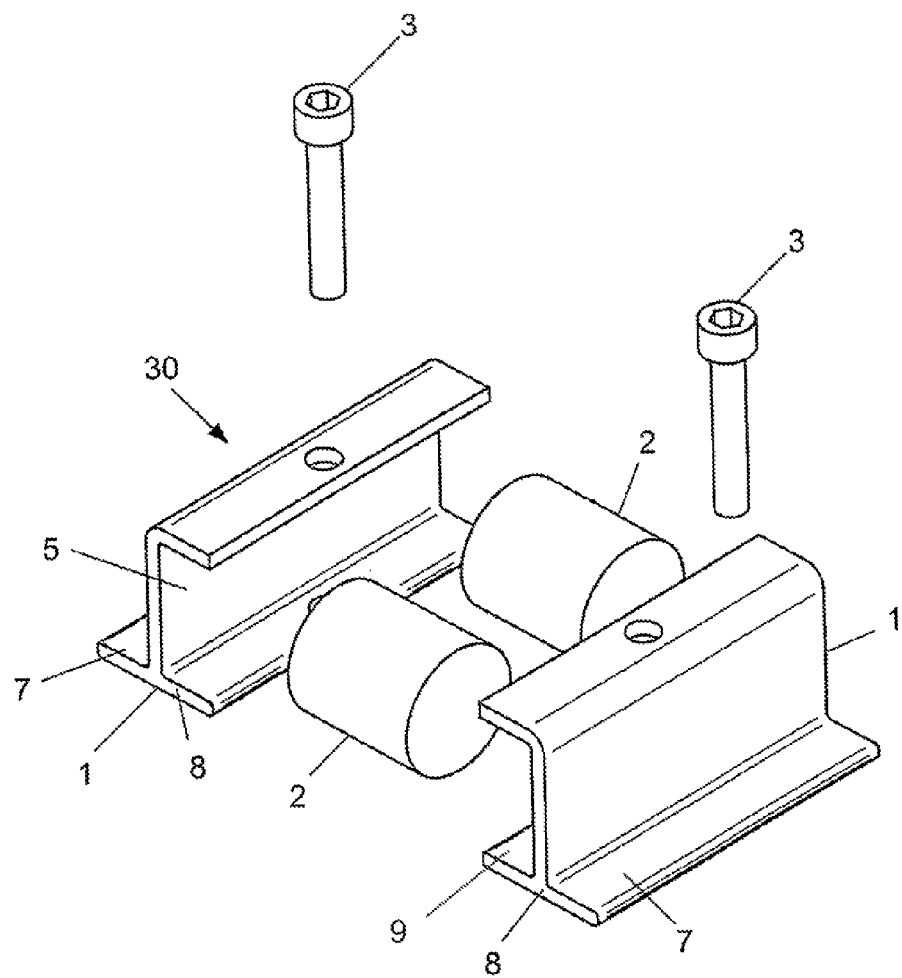
FIG. 3 schematically illustrates the construction of a conduction-cooled power capacitor with C-shaped brackets and increased cooling contact area, according to another preferred embodiment of the invention.

FIG. 3 schematically illustrates the construction of such conduction-cooled power capacitor, according to another preferred embodiment of the invention. In this alternative example, the capacitor 30 includes a C-section with fixing surfaces 7 which expand out to the side, as an additional surface with respect to the fixing base 9, in order to increase the cross-sectional area of the heat evacuating surface 8 between the capacitor 300 and the bus bar.

Figure 4:
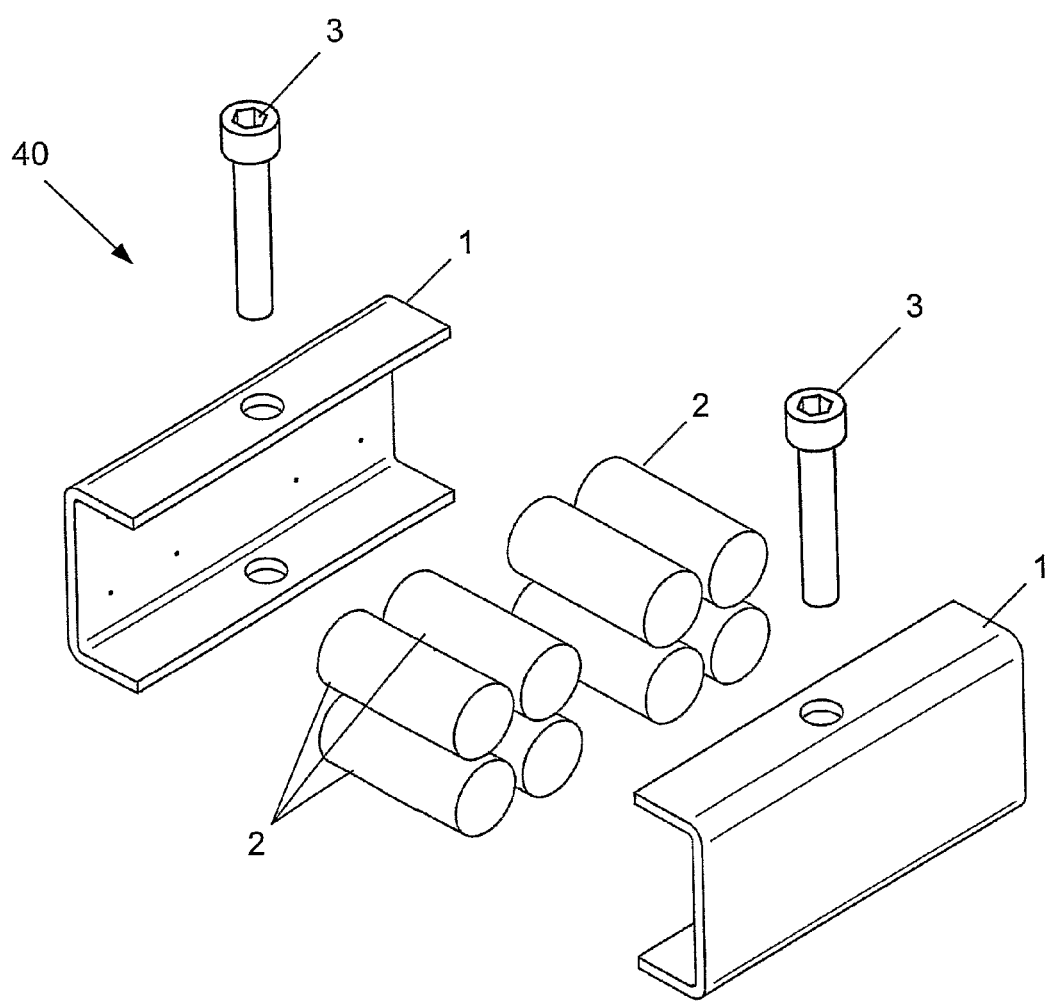
FIG. 4 schematically illustrates the construction of a conduction-cooled power capacitor using multiple smaller capacitor elements, according to a further preferred embodiment of the invention.

FIG. 4 schematically illustrates the construction of a conduction-cooled power capacitor, according to a further preferred embodiment of the invention. In this alternative example, the capacitor 40 includes a pair C-section electrodes as illustrated in FIG. 2 above. The fact that the two main surfaces 5 are planar and parallel allows replacing each capacitor element shown in FIG. 2 above by several (in this example, four) smaller capacitor elements 2.

Figure 5:
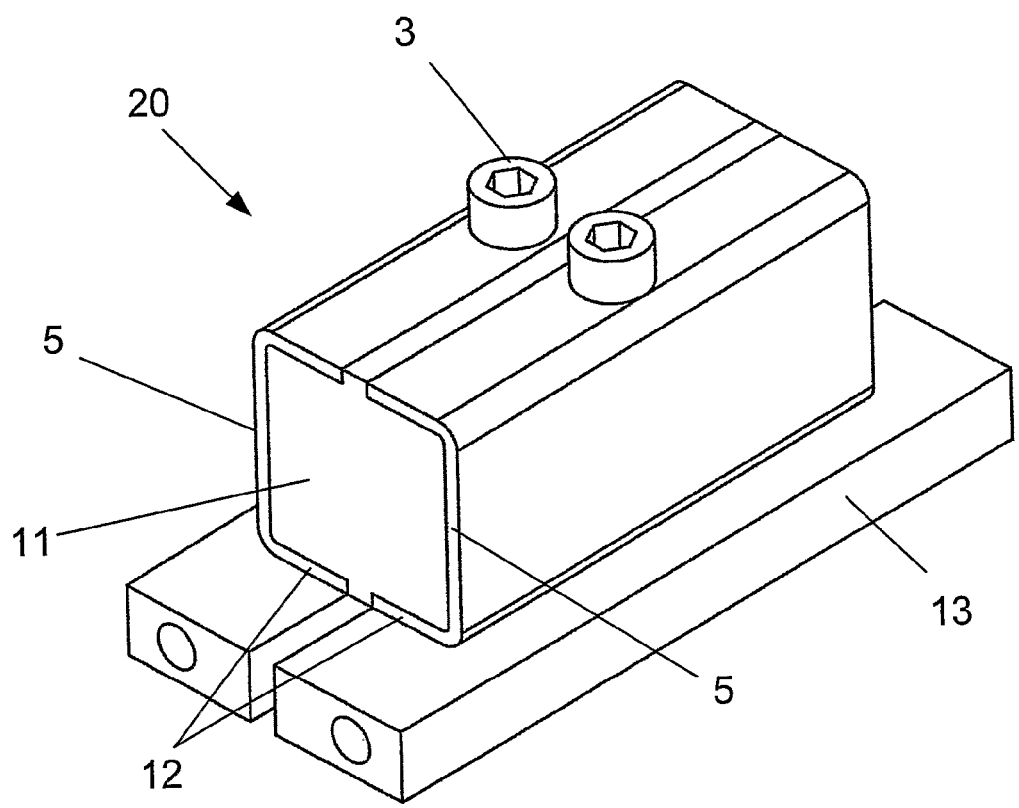
FIG. 5 schematically illustrates the implementation of a conduction-cooled power capacitor, according to a preferred embodiment of the invention.

FIG. 5 schematically illustrates the implementation of a conduction-cooled power capacitor, according to a preferred embodiment of the invention. In this alternative example, the capacitor 20 includes a pair C-section electrodes as illustrated in FIG. 2 above. The capacitor elements (not shown) are connected electrically and thermally between the two main surfaces 5. The empty space between the two main surfaces 5 is filled with a resin or other filler 11 to increase mechanical strength and improve aesthetics. Mounting bolts 3 are used to fix the base 12 of each electrode to allow connecting the capacitor 20 to a water-cooled bus bar 13.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A conduction-cooled power capacitor consisting of;
    a) two electrically and thermally conductive extrudable metal brackets being both an electrode and a fixing leg of said power capacitor; and
    b) two or more capacitor elements connected between said brackets both electrically and thermally,
    wherein, each bracket has a fixing base having one or more through holes for directly fixing said bracket to a bus-bar of a heat-sink by a mounting bolt, and an essentially planar main surface extending by a right angle corner to said fixing base and to which one end of said two or more capacitor elements is connected, said fixing base facing inwardly from said main surface,
    wherein said power capacitor is arranged such that the main surface of each of said two brackets are essentially parallel.

2. A capacitor according, to claim 1, wherein the metal brackets are L-shaped.

3. A capacitor according to claim 2, further comprising an additional surface extending outwardly from the main surface and located on the fixing base, to thereby increase contact area with the heat-sink.

4. A capacitor as in claim 3, wherein the additional surface has a bolt entry point.

5. A capacitor as in claim 2, wherein empty space between the brackets is filled with a resin or another filler material, to thereby increase mechanical strength and improve aesthetics.

6. A capacitor according to claim 1 wherein the metal brackets are C-shaped and have a member parallel to the fixing base in which is drilled a hole, a mounting bolt passing through said hole and the hole of the fixing base.

7. A capacitor according to claim 6, further comprising an additional surface extending outwardly from the main surface and located on the fixing base, to thereby increase contact area with the heat-sink.

8. A capacitor as in claim 7, wherein the additional surface has a bolt entry point.

9. A capacitor as in claim 6, wherein empty space between the brackets is filled with a resin or another filler material, to thereby increase mechanical strength and improve aesthetics.

10. A capacitor as in claim 1, wherein empty space between the brackets is filled with a resin or another filler material, to thereby increase mechanical strength and improve aesthetics.

11. A capacitor as in claim 1, wherein four or more capacitor elements are electrically and thermally connected between the two brackets.

12. A capacitor as in claim 11, wherein eight capacitor elements are electrically and thermally connected between the two brackets.

13. A capacitor according to claim 1, further comprising an additional surface extending outwardly from the main surface and located on the fixing base, to thereby increase contact area with the heat-sink.

14. A capacitor as in claim 13, wherein the additional surface has a bolt entry point.

15. A capacitor as in claim 1, wherein empty space between the brackets is filled with a resin or another filler material, to thereby increase mechanical strength and improve aesthetics.

16. A capacitor as in claim 1, wherein each of the two brackets is made of copper.

\* \* \* \* \*